United States Patent
Chen

(10) Patent No.: US 7,262,802 B2
(45) Date of Patent: Aug. 28, 2007

(54) CHARGE-COUPLED DEVICE SENSING APPARATUS WITH DUAL PHOTO SENSOR SETS

(75) Inventor: Yen-Cheng Chen, Hsinchu (TW)

(73) Assignee: Avision Inc. (TW)

( * ) Notice: Subject to any disclaimer, the term of this patent is extended or adjusted under 35 U.S.C. 154(b) by 779 days.

(21) Appl. No.: 10/638,787

(22) Filed: Aug. 11, 2003

(65) Prior Publication Data

US 2004/0032521 A1 Feb. 19, 2004

(30) Foreign Application Priority Data

Aug. 19, 2002 (TW) .................... 91118727 A

(51) Int. Cl.
*H04N 3/14* (2006.01)
*H04N 5/335* (2006.01)

(52) U.S. Cl. ............. 348/316; 348/322; 348/324; 358/483

(58) Field of Classification Search ........ 348/249, 348/294, 266, 264, 304, 305, 311; 250/208.1; 358/482, 483
See application file for complete search history.

(56) References Cited

U.S. PATENT DOCUMENTS

| | | | | |
|---|---|---|---|---|
| 5,345,319 A * | 9/1994 | Yu | ............... | 358/483 |
| 5,841,554 A * | 11/1998 | Hasegawa | ............... | 358/514 |
| 5,870,142 A * | 2/1999 | Noda et al. | ............... | 348/266 |
| 6,894,812 B1 * | 5/2005 | Spears | ............... | 358/483 |
| 7,154,641 B2 * | 12/2006 | Ichikawa | ............... | 358/483 |
| 2002/0093694 A1 * | 7/2002 | Spears | ............... | 358/474 |
| 2004/0012829 A1 * | 1/2004 | Takahashi | ............... | 358/474 |

* cited by examiner

Primary Examiner—Ngoc-Yen Vu
Assistant Examiner—John Morehead

(57) ABSTRACT

The invention provides a signal charge-coupled device (CCD) sensing apparatus, including at least one first CCD shift register, one first photo sensor set, and one second photo sensor set. The first CCD shift register includes a plurality of first CCD components and a plurality of second CCD components. The first photo sensor set includes multiple first photo sensors for receiving a first light signal and generating multiple first corresponding charge signals. The first charge signals can be received by the first CCD components. On the other hand, the second photo sensor set includes multiple second photo sensors for receiving a second light signal and generating multiple second corresponding charge signals. The second charge signals can be received by the second CCD components. The CCD sensing apparatus can acquire higher scanned image quality under high resolution.

10 Claims, 3 Drawing Sheets

CHARGE-COUPLED DEVICE SENSING APPARATUS WITH DUAL PHOTO SENSOR SETS

This application claims the benefit of Taiwan application Serial No. 91118727, filed Aug. 19, 2002.

BACKGROUND OF THE INVENTION

1. Field of the Invention

The invention relates in general to a charge-coupled device (CCD) sensing apparatus, and more particularly to a CCD sensing apparatus with dual photo sensor sets, which help retain image quality.

2. Description of the Related Art

Generally, a charge-coupled device (CCD) sensing apparatus in a carriage is applied for transferring a photo signal to an electrical signal in a scanner. A conventional CCD sensing apparatus includes at least a photo sensor set and a CCD shift register. The photo sensor set includes a number of photo sensors. The photo sensors may be photo diodes. After the photo sensors are exposed to light for a predetermined period of time, the photo sensors generate charge signals, and then the charge signals are sent to the CCD shift register. The CCD shift register can be a two phase CCD shift register. The charge signals shifted out from the CCD shift register are stored serially in a capacitor so as to generate the analog output signals. In the next stage, a circuit processes the output signals, and the digital scanned image data are then generated.

Conventionally, a stagger type CCD sensing apparatus is used in order to enhance resolution. In FIG. 1, a conventional stagger type CCD sensing apparatus is shown. The CCD sensing apparatus 102 includes a photo sensor set 106A, a photo sensor set 106B, a CCD shift register 110A, and a CCD shift register 110B. The photo sensor sets 106A and 106B are staggered. The CCD shift registers 110A and 110B receive the charge signals transmitted from the photo sensor sets 106A and 106B, respectively. Then, charge signals output by CCD shift registers 110A and 110B are stored serially in capacitors C1 and C2, respectively, to generate the analog output signals Out1 and Out2. After the output signals Out1 and Out2 are processed by a circuit in the next stage and are combined together, the scanned image data with double resolution of that of the photo sensor sets 106A or 106B are then generated.

However, minor difference in the process of producing the two CCD shift registers usually occurs. As a result, the properties of the two CCD shift registers may not be exactly the same. For example, differences in charge signal output rate and the decay rate of the charge signals could exist when the charge signals are output. Thus, the scanning quality differences may be caused by using the two CCD shift registers. Consequently, this inconsistency deteriorates image quality when the next stage circuit combines the output signals Out1 and Out2. To overcome this problem, many image processing procedures were proposed. However, most of them are complex and time-consuming.

SUMMARY OF THE INVENTION

It is therefore an object of the invention to provide a charge-coupled device (CCD) sensing apparatus. The CCD sensing apparatus has the advantages of higher resolution as well as higher scanned image quality.

The invention achieves the above-identified objects by providing a signal charge-coupled device (CCD) sensing apparatus, including at least one first CCD shift register and first and second photo sensor sets. The first CCD shift register includes a plurality of first CCD components and a plurality of second CCD components. The first photo sensor set includes multiple first photo sensors for receiving a first light signal and generating multiple corresponding first charge signals, accordingly. The first charge signals can be received by the first CCD components. The second photo sensor set includes multiple second photo sensors for receiving a second light signal and generating multiple corresponding second charge signals, accordingly. The second charge signals can be received by the second CCD components.

Other objects, features, and advantages of the invention will become apparent from the following detailed description of the preferred but non-limiting embodiments. The following description is made with reference to the accompanying drawings.

DETAILED DESCRIPTION OF THE INVENTION

The signal charge-coupled device (CCD) sensing apparatus of the invention has two photo sensor sets that share a CCD shift register to achieve the object of the invention. Using and sharing one CCD shift register instead of two CCD shift registers to transmit charge signals prevents problem of reducing image quality caused by differences between the properties of different CCD shift registers.

Figure 1:
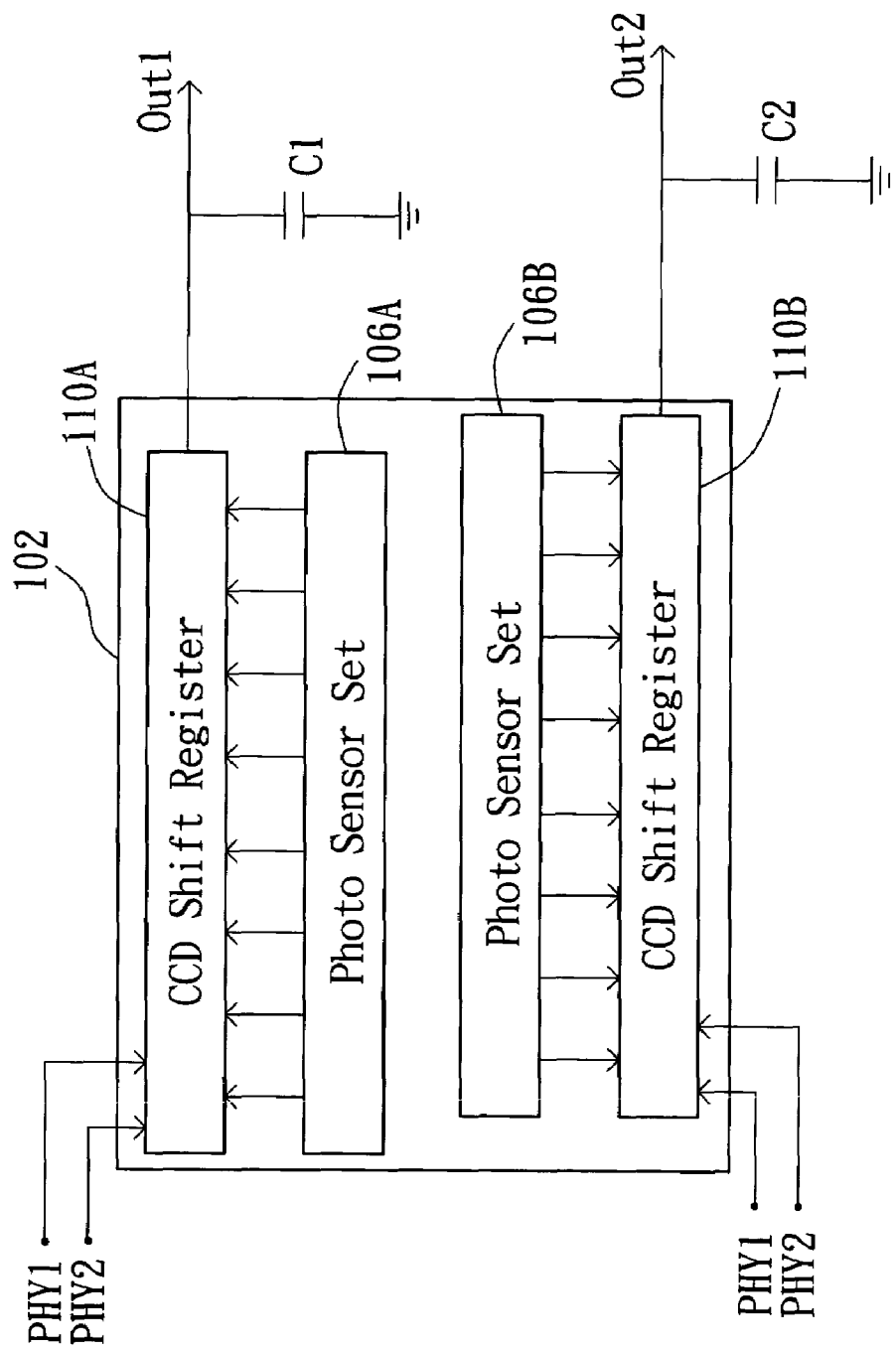
FIG. 1 (prior art) illustrates a conventional stagger type charge-coupled device (CCD) sensing apparatus.
Figure 2:
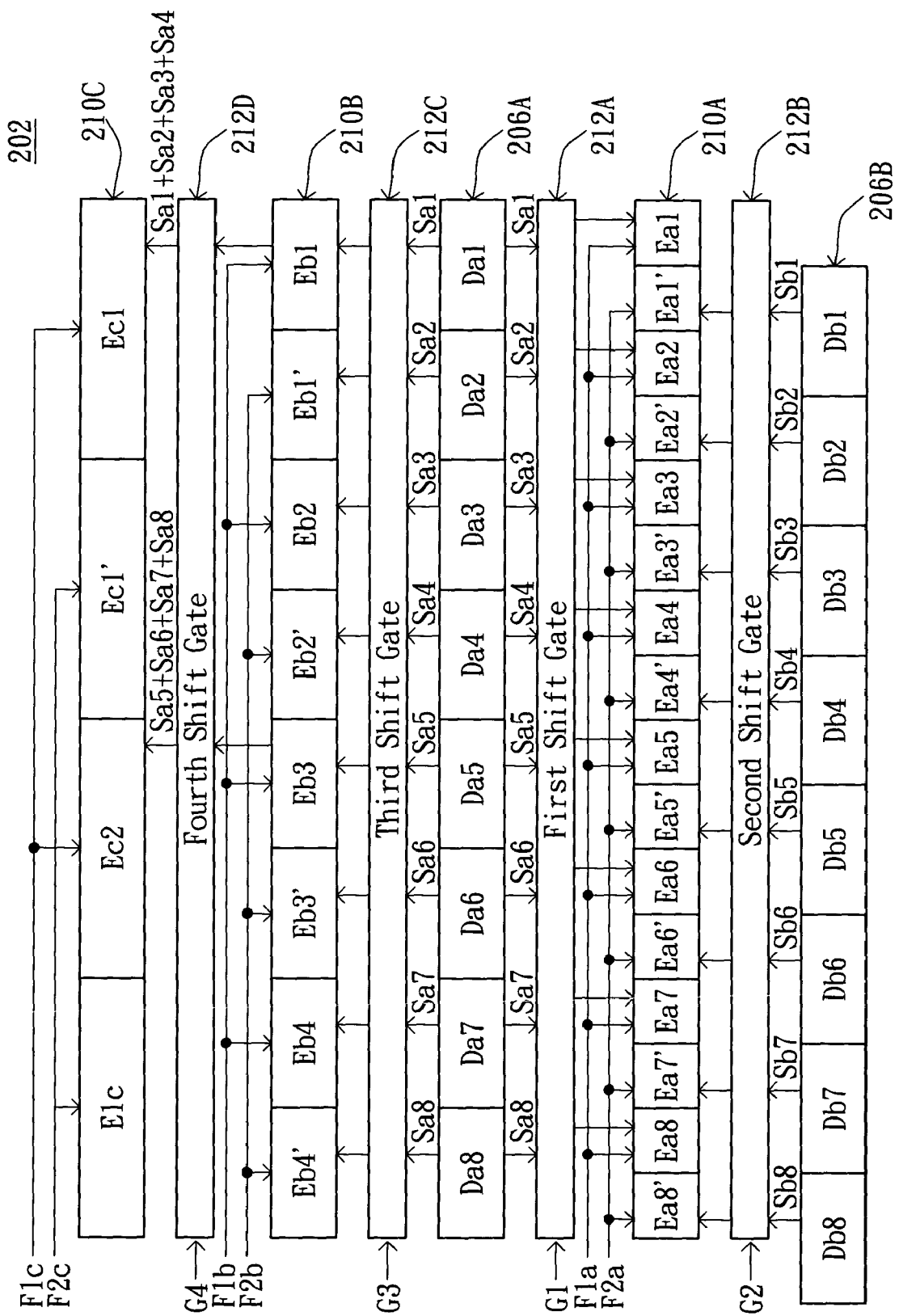
FIG. 2 is a block diagram of a charge-coupled device (CCD) sensing apparatus according to the preferred embodiment of the invention.

FIG. 2 is a block diagram of a charge-coupled device (CCD) sensing apparatus according to the preferred embodiment of the invention. The CCD sensing apparatus 202 includes at least a first CCD shift register 210A, a first photo sensor set 206A, and a second photo sensor set 206B.

The first CCD shift register 210A includes a plurality of first CCD components Ea and a plurality of second CCD components Ea'. For instance, the first CCD components can be labeled as Ea1~Ea8 and the second CCD components be can be labeled as Ea1'~Ea8'. All of the first CCD components Ea are spaced alternately with their corresponding second CCD components Ea'. One of the examples of its sequential order is as follows: the first CCD component (labeled as Ea1), the second CCD component (labeled as Ea1'), the first CCD component (labeled as Ea2), the second CCD component (labeled as Ea2'), and so on.

In addition, the first photo sensor set 206A includes a number of first photo sensors Da, such as first photo sensors Da1~Da8. The first photo sensors Da is used for receiving a first light signal (not shown in the drawings) and then generating multiple corresponding first charge signals Sa, such as first charge signals Sa1~Sa8. The first charge signals Sa can be transmitted to the first CCD components Ea under the control of a first shift gate 212A. For example, the first photo sensor Da1 generates the first charge signal Sa1; the charge signal Sa1 is then transmitted to the first CCD component Ea1 when a control signal G1, which controls the first shift gate 212A, is enabled.

The second photo sensor set 206B includes several second photo sensors Db, such as second photo sensors Db1~Db8. The second photo sensors Db are used for receiving a second light signal (not shown in the drawings) and then generate multiple corresponding second charge signals Sb, such as second charge signals Sb1~Sb8. The second charge signals Sb can be transmitted to the second CCD components Ea' under the control of a second shift gate 212B. For example, the second photo sensor Db1 generates the second charge signal Sb1; the charge signal Sb1 is then transmitted to the second CCD component Ea1' when a control signal G2, which controls the second shift gate 212B, is enabled.

The first photo sensor set 206A and the second photo sensor set 206B are located on opposite sides of the first CCD shift register 210A.

When the distance between the first photo sensor set 206A and the second photo sensor set 206B is close enough, the first photo sensor set 206A and the second photo sensor set 206B can sense the same light signal. In other words, the first and second light signals mentioned above can be the same light signal.

The CCD sensing apparatus 202 applies to the high resolution scanning describes as follows. As the first photo sensor set 206A and second photo sensor set 206B are exposed to light and receive the light signal for a predetermined period of time, the first photo sensor set 206A and second photo sensor set 206B generate multiple first charge signals Sa and second charge signals Sb, respectively. When the first CCD shift register 210A is a two-phase CCD shift register, there are various ways to shift out the multiple first charge signals Sa and second charge signals Sb. The following method is an example. First, under the control of the first shift gate 212A, all of the first charge signals Sa are transferred to the first CCD components Ea of the first CCD shift register 210A, so that none of the second CCD components Ea' stores any of the charge signals. Subsequently, by controlling phase signals F1$a$ and F2$a$, which are of different phases, the first charge signals Sa stored in the first CCD components Ea can be shifted out to a capacitor (not shown in the FIG. 2); and a first image signal is produced. Then, similarly, under the control of the second shift gate 212B, all of the second charge signals Sb are transferred to the second CCD components Ea' of the first CCD shift register 210A, so that none of the first CCD components Ea stores any of the charge signals. Subsequently, by controlling phase signals F1$a$ and F2$a$, the second charge signals Sb stored in the second CCD components Eb' can be shifted out to the same capacitor; and a second image signal is produced. The first and second image signals can be combined together by the control circuit or image processing procedure to produce an image signal with double resolution of that of the first photo sensor set 206A or the second photo sensor set 206B.

Accordingly, the first charge signals Sa or the second charge signals Sb generated by the first photo sensor set 206A or the second photo sensor set 206B, respectively, are both shifted out by the same first CCD shift register 210A. Therefore, the invention solves problems caused by property differences when using two conventional CCD shift registers. Thus, the scanned image of the invention is of high quality. In addition, compared to the conventional stagger type CCD sensing apparatus, since the invention can achieve the object by using only one shift register, the invention further has the advantage of reducing cost.

Additionally, the invention is suitable for scanning at different resolutions. If an image signal with the same resolution as that of the first photo sensor set 206A or the second photo sensor set 206B is desired, first, the first charge signals Sa and second charge signals Sb can be transferred simultaneously to the first CCD components Ea and second CCD components Ea', respectively. Then, the first charge signal Sa and second charge signal Sb are combined together and stored in the first CCD components Ea. For example, the first charge signal Sa1 and second charge signal Sb1 can be combined together and stored in the first CCD component Ea1, and, similarly, the first charge signal Sa2 and second charge signal Sb2 can be combined together and stored in the first CCD component Ea2, and so forth. The second CCD components Ea' do not store any of the charge signals at this time and are, thus, able to shift out the charge signals Sa+Sb stored in the first CCD components Ea under the control of phase signals F1$a$ and F2$a$. As a result, the image signal has the same resolution as that of the first photo sensor set 206A or the second photo sensor set 206B. Thus, the exposure time of the photo sensor set can be reduced and the scanning speed increased.

In order to obtain image signals of other resolutions, the CCD sensing apparatus of the invention can also include a second CCD shift register 210B and a third CCD shift register 210C. The first charge signals Sa generated by the first photo sensor set 206A also can be transmitted to the second CCD shift register 210B under the control of a third shift gate 212C. Furthermore, the first charge signals Sa can be transmitted from the second CCD shift register 210B to the third CCD shift register 210C under the control of a fourth shift gate 212D.

Accordingly, with the use of the second CCD shift register 210B, image signals with half resolution of that of the first photo sensor set 206A or the second photo sensor set 206B can be obtained. The operations are as follows. First, a control signal G3 is enabled, which controls the third shift gate 212C; and the control signal G1 is disabled, which controls the first shift gate 212A. The first charge signals Sa are then transmitted to the second CCD shift register 210B, where each of the first charge signals Sa is stored in one of the specific CCD components Eb or Eb' of the second shift register 210B. For example, the first charge signals Sa1 and Sa2 are stored in the CCD components Eb1 and Eb1', respectively, while the charge signals Sa3 and Sa4 are stored in the CCD components Eb2 and Eb2', respectively. Later, the charge signals stored in the CCD component Eb' can be combined to the charge signals stored in the CCD component Eb and stored in the CCD component Eb, and then under the control of phase signals F1$b$ and F2$b$ with different phases, the charge signals in the CCD component Eb are shifted out. In this way, the image signals with half resolution of that of the first photo sensor set 206A can be obtained.

Moreover, by using the third CCD shift register 210C, the image signals with one-fourth resolution of that of the first photo sensor set 206A can be obtained. The operations are as follows. First, using steps similar to the one described above, two first charge signals Sa are combined and stored to a specific CCD component Eb of the second CCD shift register 210B. Then the charge signals in the CCD component Eb with even numbers are combined to the charge signals in the CCD component Eb with odd numbers and stored in the CCD component Eb with odd numbers. At this time, each of the CCD components Eb with odd numbers stores four charge signals. When the control signal G4, which controls the fourth shift gate 212D, is enabled, the first charge signals Sa can be transmitted to the third CCD shift register 210C. Presently, four of the first charge signals Sa are simultaneously stored in one of the CCD components Ec of the third shift register 210C. For example, the first charge signals Sa1, Sa2, Sa3, and Sa4 are stored in the CCD component Ec1, while the first charge signals Sa5, Sa6, Sa7, and Sa8 are stored in the CCD component Ec2, and so forth.

Then, under the control of phase signals F1c and F2c with different phases, the charge signals in the CCD component Ec are shifted out. In this way, the image signals with one-fourth resolution of that of the first photo sensor set 206A can be obtained.

Figure 3:
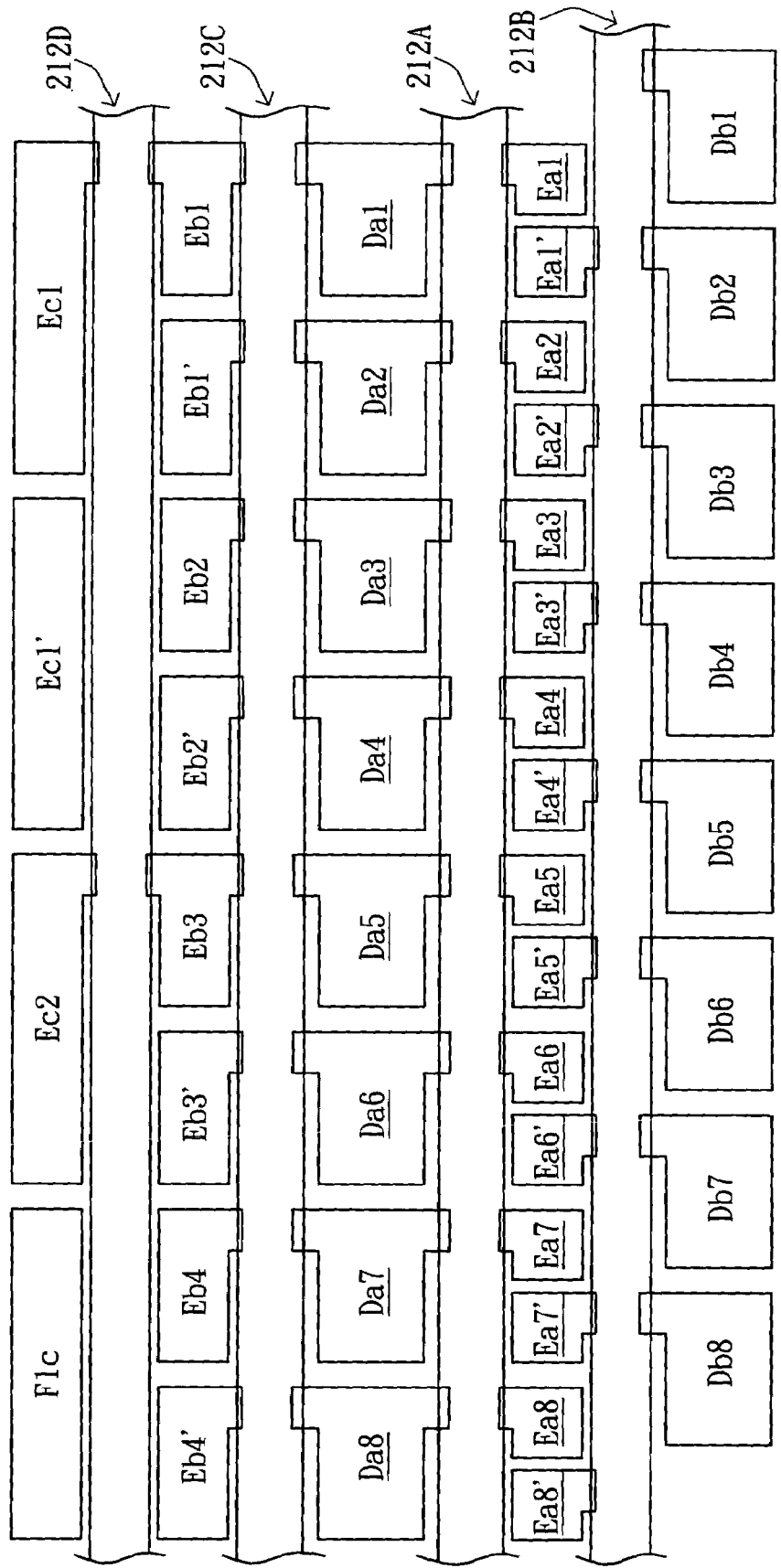
FIG. 3 shows a layout diagram of the CCD shift registers shown in FIG. 2, according to the preferred embodiment of the invention.

FIG. 3 shows a layout diagram of the CCD shift registers shown in FIG. 2, according to the preferred embodiment of the invention. By overlapping some parts of $SiO_2$ layer of the CCD components and the shift gate, a charge signal transfer path is formed. Thus, the object of the invention can be achieved.

Even though the CCD shift registers with two phases are used in the preferred embodiment described above, it is suitable to use CCD shift registers with three phases as well.

Therefore, as the invention discloses above, the CCD sensing apparatus has the advantage of higher resolution and higher quality scanned images. Furthermore, the invention reduces costs, while at the same time providing the additional function of being able to scan and process images with different resolutions.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A charge-coupled device (CCD) sensing apparatus, comprising:
    a CCD shift register having a plurality of first CCD components and a plurality of second CCD components;
    a first photo sensor set having a plurality of first photo sensors for receiving a first light signal and generating a plurality of corresponding first charge signals accordingly, the first charge signals being transmitted to the first CCD components selectively; and
    a second photo sensor set having a plurality of second photo sensors for receiving a second light signal and generating a plurality of corresponding second charge signals accordingly, the second charge signals being transmitted to the second CCD components selectively;
    wherein the CCD shift register includes a number of the first CCD components and the second CCD components at least as many as the sum of the number of the first photo sensors and the number of the second photo sensors; wherein the CCD sensing apparatus further comprises another CCD shift register, the first charge signals generated by the first photo sensor set being transmitted to the another CCD shift register selectively; wherein the CCD sensing apparatus further comprises a third CCD shift register, the first charge signals generated by the first photo sensor set being transmitted to the third CCD shift register selectively via the another CCD shift register.

2. The CCD sensing apparatus according to claim 1, wherein the first CCD components and the second CCD components are arranged alternately.

3. The CCD sensing apparatus according to claim 1, wherein the first photo sensor set and the second photo sensor set are located on opposite sides of the CCD shift register.

4. The CCD sensing apparatus according to claim 1, wherein the first charge signals generated by the first photo sensor set are transmitted to the first CCD components under the control of a first shift gate.

5. The CCD sensing apparatus according to claim 1, wherein the second charge signals generated by the second photo sensor set are transmitted to the second CCD components under the control of a second shift gate.

6. The CCD sensing apparatus according to claim 1, wherein the first charge signals are transmitted to the another CCD shift register under the control of a third shift gate.

7. The CCD sensing apparatus according to claim 1, wherein the first charge signals are transmitted from the another CCD shift register to the third CCD shift register under the control of a fourth shift gate.

8. The CCD sensing apparatus according to claim 1, wherein the resolution of the first photo sensor set is substantially equal to the resolution of the second photo sensor set, and the first light signal and the second light signal are the same light signal, so that after a first image corresponding to the first charge signals and a second image corresponding to the second charge signals are combined, a third image with double resolution of the resolution of the first photo sensor set is obtained.

9. The CCD sensing apparatus according to claim 1, wherein the number of the first photo sensors per unit length is substantially equal to the number of the second photo sensors per unit length, the location of each first photo sensor corresponds to the location of the corresponding first CCD component, and the location of each second photo sensor corresponds to the location of the corresponding second CCD component.

10. A signal charge-coupled device (CCD) sensing apparatus, comprising:
    a CCD shift register having a plurality of first CCD components and a plurality of second CCD components; wherein the first CCD components and the second CCD components are arranged alternately;
    a first photo sensor set having a plurality of first photo sensors for receiving a first light signal and generating a plurality of corresponding first charge signals accordingly, the first charge signals being transmitted to the first CCD components selectively under the control of a first shift gate; and
    a second photo sensor set having a plurality of second photo sensors for receiving a second light signal and generating a plurality of corresponding second charge signals accordingly, the second charge signals being transmitted to the second CCD components selectively under the control of a second shift gate;
    wherein the first photo sensor set and the second photo sensor set are located on opposite sides of the CCD shift register;
    wherein the CCD shift register includes a number of the first CCD components and the second CCD components at least as many as the sum of the number of the first photo sensors and the number of the second photo sensors; wherein the CCD sensing apparatus further comprises another CCD shift register, wherein the first charge signals generated by the first photo sensor set are transmitted to the another CCD shift register selectively under the control of a third shift gate; wherein the CCD sensing apparatus further comprises a third CCD shift register, the first charge signals generated by the first photo sensor set being transmitted to the third CCD shift register selectively via the another CCD shift register under the control of a fourth gate.

* * * * *